United States Patent
Bray et al.

(10) Patent No.: US 9,935,965 B2
(45) Date of Patent: *Apr. 3, 2018

(54) ESTABLISHING AND USING A TRUST LEVEL IN MOBILE PHONES

(71) Applicant: International Business Machines Corporation, Armonk, NY (US)

(72) Inventors: Gavin G. Bray, Robina (AU); Chia-Le Cheng, Sunnybank (AU); Elizabeth M. Hughes, Currumbin Valley (AU); Kalvinder P. Singh, Miami (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/711,905

(22) Filed: May 14, 2015

(65) Prior Publication Data

US 2016/0337375 A1  Nov. 17, 2016

(51) Int. Cl.
*H04L 29/06* (2006.01)
*H04W 12/08* (2009.01)
*G06F 21/60* (2013.01)

(52) U.S. Cl.
CPC .......... *H04L 63/107* (2013.01); *G06F 21/606* (2013.01); *H04L 63/105* (2013.01); *H04W 12/08* (2013.01); *G06F 2221/2111* (2013.01)

(58) Field of Classification Search
None
See application file for complete search history.

(56) References Cited

U.S. PATENT DOCUMENTS

| | | | |
|---|---|---|---|
| 8,315,595 B2 * | 11/2012 | Murphy | H04L 63/12 455/410 |
| 8,839,397 B2 | 9/2014 | Schultz et al. | |
| 8,844,012 B1 | 9/2014 | Chan et al. | |
| 9,201,131 B2 * | 12/2015 | Whelan | H04B 7/18593 |
| 2006/0168022 A1 * | 7/2006 | Levin | G06F 21/606 709/206 |
| 2007/0030824 A1 * | 2/2007 | Ribaudo | G01S 5/0018 370/328 |
| 2007/0237096 A1 | 10/2007 | Vengroff et al. | |
| 2008/0132251 A1 | 6/2008 | Altman et al. | |
| 2008/0155644 A1 * | 6/2008 | Baranov | H04W 12/10 726/1 |
| 2009/0199264 A1 | 8/2009 | Lang | |
| 2010/0011048 A1 | 1/2010 | Morris | |
| 2011/0093615 A1 | 4/2011 | Novo Diaz et al. | |
| 2011/0138443 A1 * | 6/2011 | Gerard | H04L 63/105 726/2 |
| 2011/0238517 A1 | 9/2011 | Ramalingam et al. | |
| 2012/0271954 A1 * | 10/2012 | Wood | H04L 47/10 709/226 |

(Continued)

OTHER PUBLICATIONS

Appendix P—List of IBM Patents or Patent Applications Treated as Related.

(Continued)

*Primary Examiner* — Trang Doan
(74) *Attorney, Agent, or Firm* — Gilbert Harmon, Jr.

(57) ABSTRACT

Automatically establishing and/or modifying a trust relationship between devices, including mobile devices, in communication, and customizing a user interface workflow based on the trust relationship. Trust relationships are based on numerous proximity-related factors including automatically gathered proximity data, length of time in proximity, and signals detected from a target communication device as well as other nearby communication devices.

12 Claims, 5 Drawing Sheets

(56) References Cited

U.S. PATENT DOCUMENTS

| | | | |
|---|---|---|---|
| 2012/0329475 A1 | 12/2012 | Ribaudo et al. | |
| 2013/0017840 A1* | 1/2013 | Moeglein | G01S 5/0205 455/456.1 |
| 2013/0035114 A1 | 2/2013 | Holden et al. | |
| 2013/0054966 A1 | 2/2013 | Clay | |
| 2013/0198811 A1* | 8/2013 | Yu | H04L 63/104 726/4 |
| 2013/0312116 A1* | 11/2013 | Park | G06Q 50/01 726/28 |
| 2013/0343542 A1* | 12/2013 | Rosati | H04W 12/04 380/270 |
| 2014/0090033 A1* | 3/2014 | Lerner | H04L 63/10 726/5 |
| 2014/0149571 A1* | 5/2014 | Christensen | H04L 43/0811 709/224 |
| 2014/0180576 A1 | 6/2014 | LaMarca et al. | |
| 2014/0283031 A1 | 9/2014 | Eksten et al. | |
| 2015/0046696 A1 | 2/2015 | Zheng | |
| 2015/0161643 A1 | 6/2015 | Randell et al. | |
| 2015/0237071 A1 | 8/2015 | Maher et al. | |
| 2015/0271156 A1 | 9/2015 | Ronca | |
| 2015/0365427 A1 | 12/2015 | Ben-Shalom et al. | |
| 2016/0050529 A1* | 2/2016 | Hassan | H04W 4/023 709/203 |

OTHER PUBLICATIONS

U.S. Appl. No. 14/731,849 entitled "Establishing and Using a Trust Level in Mobile Phones", filed Jun. 5, 2015.

Ghosh, Shona, "Google acquires file-sharing app maker Bump", Wednesday, Sep. 18, 2013, 6 pages, <http://www.pcauthority.com.au/News/357438,google-acquires-file-sharing-app-maker-bump.aspx>.

High, Peter, "Forrester: Top Technology Trends for 2014 and Beyond", Nov. 25, 2013 @8:21AM, 11 pages, <http://www.forbes.com/sites/peterhigh/2013/11/25/forrester-top-technology-trends-for-2014-and-beyond/>.

Kumar et al., "Proximity based trust-advisor using encounters for mobile societies: Analysis of four filters", Wireless Communications and Mobile Computing, Wirel. Commun. Mob. Comput. 2010; 10:1605-1619 Published online in Wiley Online Library, (wileyonlinelibrary.com) DOI: 10.1002/wcm.1059.

McCullagh, Declan, "FBI taps cell phone mic as eavesdropping tool", CNET News, Dec. 1, 2006 2:20 PM PST, 9 pages, <http://news.cnet.com/2100-1029_3-6140191.html>.

Trapp et al., "Bridge the Gap: Measuring and Analyzing Technical Data for Social Trust between Snnartphones", arXiv:1205.3068v1 [cs.NI] May 14, 2012, 7 pages.

"Bluetooth" Wikipedia, the free encyclopedia, page last modified on Jan. 6, 2015 at 21:07, 30 pages, <http://en.wikipedia.org/wiki/Bluetooth>.

"List of most downloaded Android applications", Wikipedia, the free encyclopedia, page last modified on Jan. 1, 2015 at 21:31, 11 pages, <http://en.wikipedia.org/wiki/List_of_most_downloaded_Android_applications>.

"Near field communication", Wikipedia, the free encyclopedia, page last modified on Jan. 6, 2015 at 00:58, 18 pages, <http://en.wikipedia.org/wiki/Near_field_communication>.

"Smartphone, Cellular, Mobile and Hand Phone Detection", Libelium, provided by Inventor in Main Idea of Disclosure dated Apr. 11, 2014, 8 pages, <http://www.libelium.com/products/meshlium/smartphone-detection/>.

* cited by examiner

ESTABLISHING AND USING A TRUST LEVEL IN MOBILE PHONES

BACKGROUND OF THE INVENTION

The present invention relates generally to the field of trust levels between mobile communication devices (including mobile devices, mobile phones, smartphones, etc.).

Establishment of a trust level for computer users, computer hardware, computer software and/or data communications is known. A "trust level" is typically established for personal and/or data security reasons such that access to sensitive data is granted or restricted based upon a trust level of people, machine logic and/or hardware seeking access. Data security typically entails protecting data from disclosure to unauthorized users, and from tampering by unauthorized users.

US patent application 2015/0046696 discloses as follows: "Methods, apparatuses, and computer program products are herein provided for controlling access of communications in a Pervasive Social Network (PSN) using a local trust level and/or a general trust level . . . . [A] user operating a communication device on a PSN may select other users with at least a minimum level of local and/or general trust for secure communications. For example, users having a communication device (e.g., a mobile device) with a trust level lower than the minimum level of trust would not be configured to access the secure communications."

SUMMARY

According to an aspect of the present invention, there is a method, computer program product and/or system that performs the following operations (not necessarily in the following order): (i) receiving a historical locational data set including information about device location for a first communication device and a second communication device; and (ii) applying a first set of machine logic based rules to the historical locational data set to determine a trust level for communications, between the first communication device and the second communication device, based, at least in part, upon relative distance over time between the first communication device and the second communication device.

DETAILED DESCRIPTION

Some embodiments of the present invention determine the trust level among communications devices as follows: (i) based, at least in part, upon spatial distance between the two communicating devices; (ii) where the distance between the communicating devices is subject to frequent change over time (for example, where at least one of the communicating devices is a mobile communication device, such as a smartphone); and (iii) the spatial distance, upon which a trust level is at least partially based includes historical proximity data corresponding to spatial distance between the devices at various times in the past so that the changing distance between the communicating devices can be accounted for in a dynamic way. At least some embodiments of the present invention will work when: (i) two communicating devices are relative constant in distance between them (for example, two desktop computers respectively used in two offices on the same floor of an office building); and (ii) when two communicating devices tend to change with respect to distance between them (for example, two mobile phones respectively used by two different family members for personal use).

This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
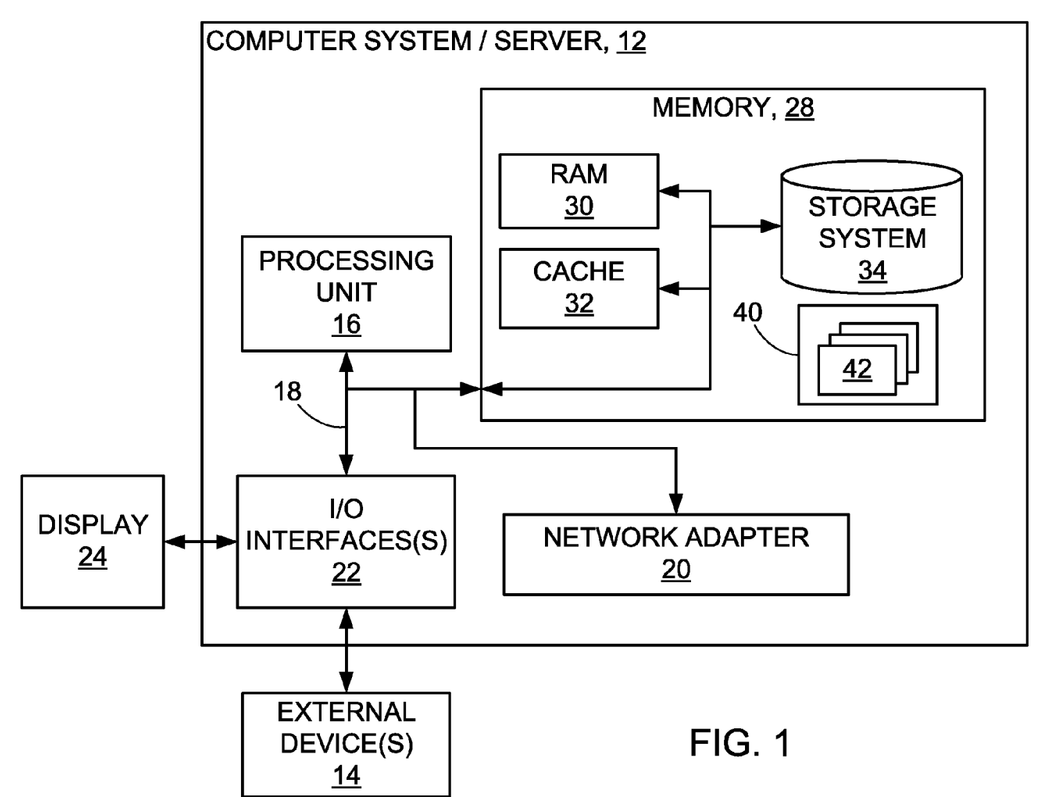
FIG. 1 depicts a cloud computing node used in a first embodiment of a system according to the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
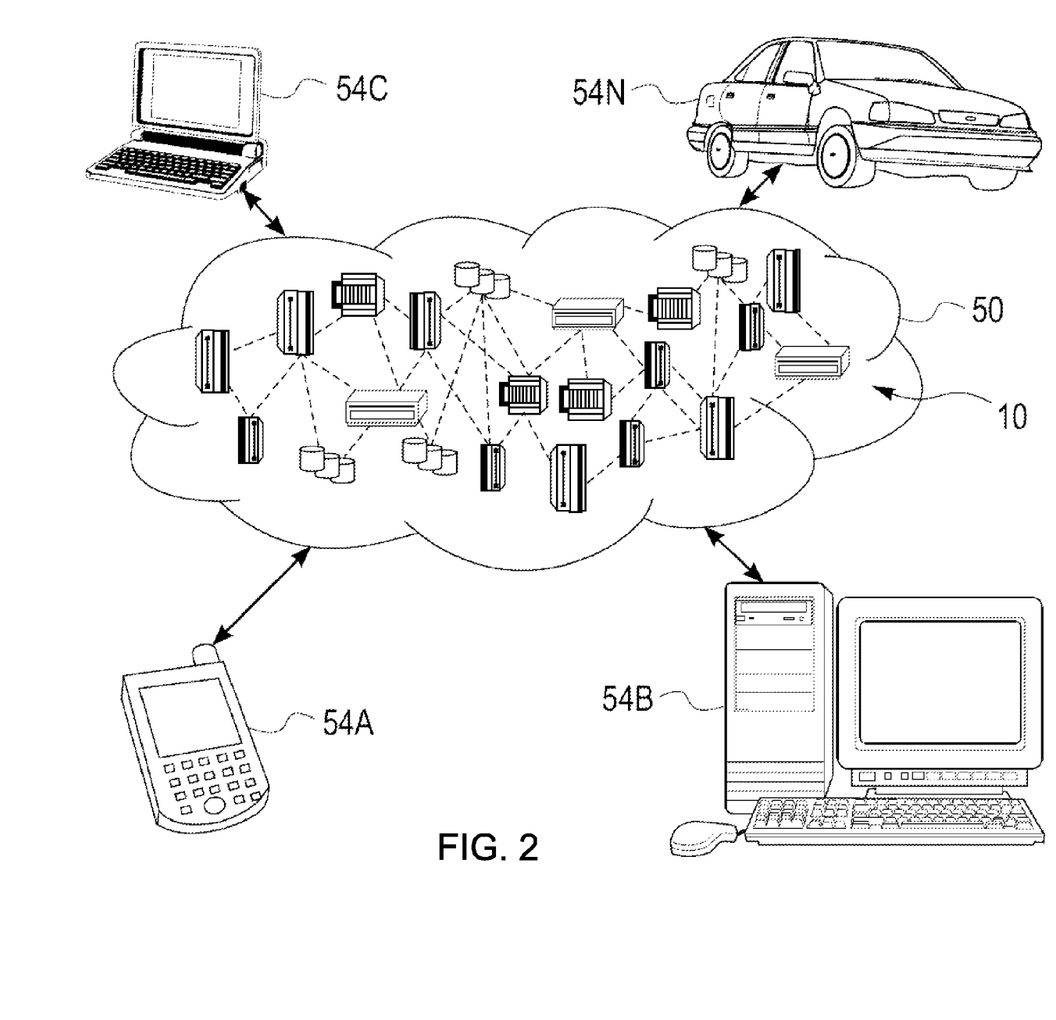
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
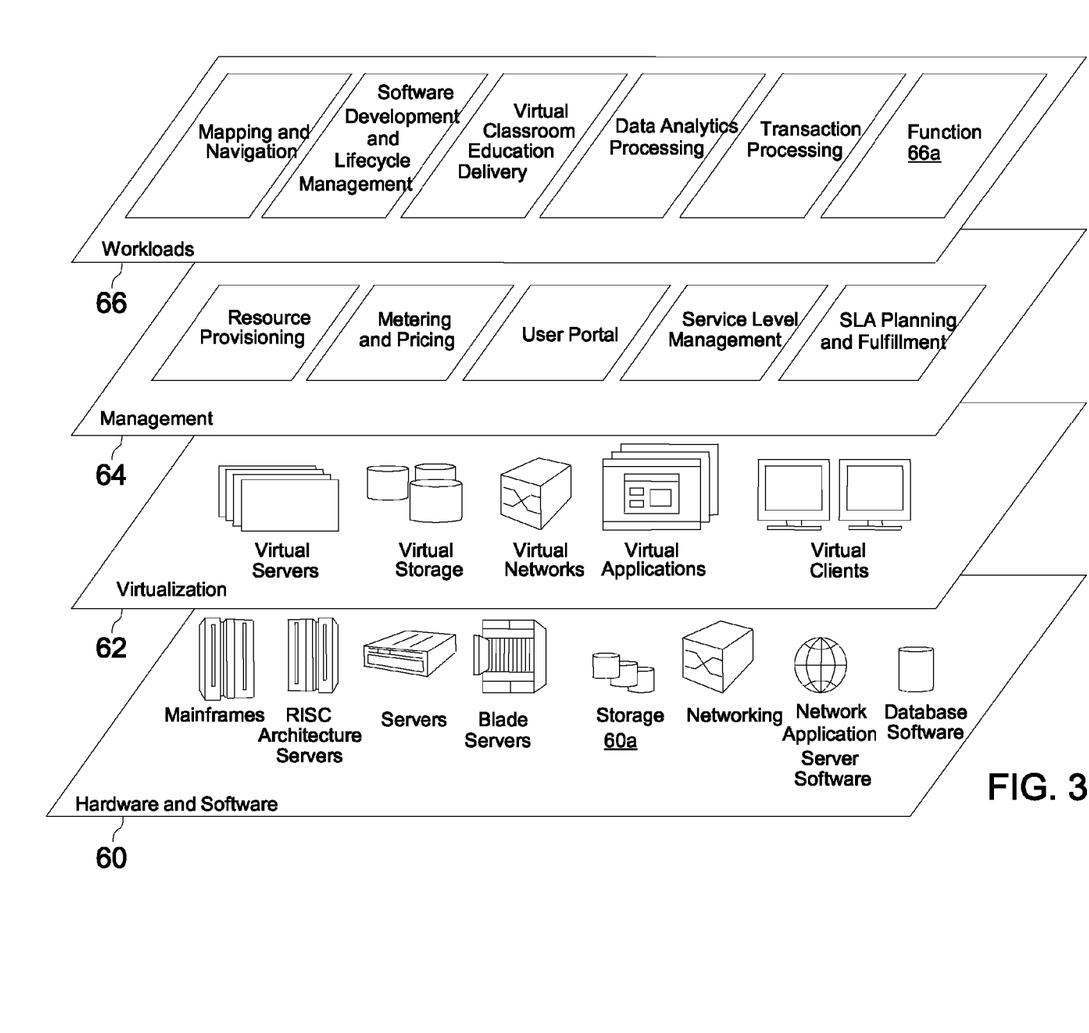
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes; RISC (Reduced Instruction Set Computer) architecture based servers; storage devices; networks and networking components. In some embodiments software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 4:
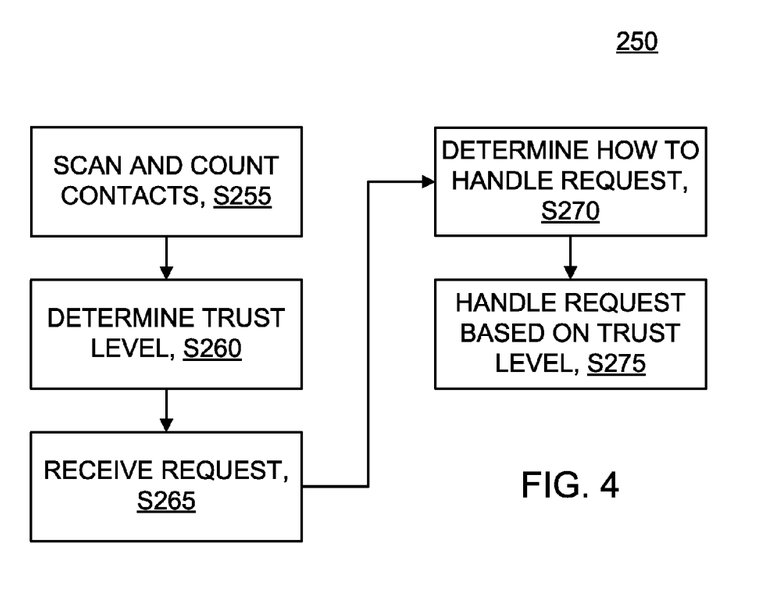
FIG. 4 is a flowchart showing a first embodiment method performed, at least in part, by the first embodiment system.
Figure 5:
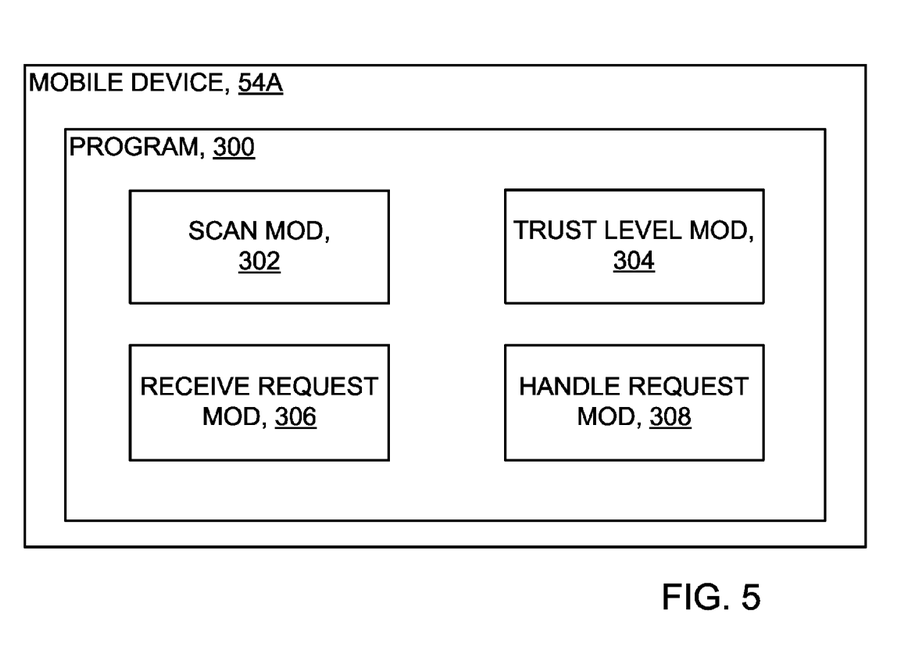
FIG. 5 is a block diagram showing machine logic (for example, software) used to perform, at least in part, the first embodiment method.

FIG. 4 shows flowchart 250 depicting a method according to the present invention. FIG. 5 shows program 300 for performing at least some of the method steps of flowchart 250. This method and associated software will now be discussed, over the course of the following paragraphs, with extensive reference to FIG. 4 (for the method step blocks) and FIG. 5 (for the software blocks). In this example, method embodiment, mobile device 54A (see FIG. 2) has been keeping track of close proximity events (herein sometimes referred to as "contacts") with other devices, such as laptop device 54C, and, as will be further explained below, device 54A uses this information to determine how to handle a request to communicate an Instant messaging (IM) message from device 54C.

Processing begins at step S255, where scan module ("mod") 302 of program 300 of device 54A continuously scans for Wi-Fi type and Bluetooth type signals from other devices identifiable from their Wi-Fi type and/or Bluetooth type wireless transmissions. More specifically, in this example, mod 302 identifies other devices by their MAC (media access control) address, when that address is available in the Wi-Fi type and/or Bluetooth type wireless transmissions they make. Mod 302 does not communicate back to the devices that it detects, but, rather, just stores the fact that device 54A was in close enough proximity to another device, on a given day to: (i) detect a Bluetooth type signal from that device (sometimes referred to herein as a "Bluetooth type contact"); or (ii) detect a Wi-Fi type signal from that device (sometimes referred to herein as a "Wi-Fi type contact"). In this embodiment, if both Bluetooth type contact and Wi-Fi type contact is made on a given day, then only the Bluetooth type contact is recorded. In this embodiment, multiple contacts on a single day are not counted separately. As well be discussed below in the Further Comments And/Or Embodiments sub-section of this Detailed Description section, other types of wireless transmission could be additionally, or alternatively, scanned for by device 54A.

Processing proceeds to step S260, where trust level mod 304 determines a trust level for every device that makes a contact. The trust level is determined based on a set of rules implemented in the machine logic of mod 304. More specifically, in this embodiment: (i) the trust level value for a device has a minimum value of zero and a maximum value of 1.0; (ii) for every day in the past six (6) months that a Bluetooth type contact is made, 0.05 is added to the trust level value (up to a maximum of 1.0); and (iii) for every day in the past six (6) months that a Wi-Fi type contact is made, 0.02 is added to the trust level value (up to a maximum of 1.0). Many other sets of rules are possible for translating close proximity events into trust level values, as will be appreciated by those of skill in the art. In this embodiment, the trust level is a function only of Wi-Fi type and Bluetooth type contacts. Alternatively, other factors may be considered—to name just a few of virtually limitless possibilities for other factors: (i) a user of device 54A manually sets a trust level value that overrides any contact based value; (ii) previous communications between devices (for example, phone calls, file transfers, etc.) is also a factor in determining trust level; and/or (iii) context information, such as device operating system language is an additional factor used in determining trust level.

Processing proceeds to step S265, where receive mod 306 receives a request from laptop device 54C to communicate an IM to device 54A. As will be discussed, below, in the Further Comments And/Or Embodiments sub-section of this Detailed Description section, various embodiments of the present disclosure can be applied to other types of communication requests, other than requests to communicate IM's.

Processing proceeds to step S270, where handle request mod 308 determines how this communication request is to be handled by device 54A based, at least in part, upon the trust level value for device 54C. In this example, mod 308 includes a set of machine logic based rules which determine how to handle the request based solely on the trust level value.

More specifically, the rules of mod 308 specify that for a device requesting contact by IM: (i) if the requesting device (device 54C in this example) has a trust level value less than 0.05 (or 5%), then the IM message will be refused an automatic message refusing the IM will be sent back to device 54C by mod 308; (ii) if the requesting device has a trust level value between 5% and 50% then the user will be given the option to accept or refuse the IM (see FIG. 6 at window 402 displayed on display 400 of device 54A); (iii) if the requesting device has a trust level value greater than 50%, but less than 100%, then the content of the IM will be communicated to display 400 of device 54A without any action on the part of the user of device 54A; and (ii) if the if the requesting device has a trust level value 100%, then the content of the IM will be communicated to display 400 of device 54A without any action on the part of the user of device 54A and an audio indication of the new IM will also be presented through the speakers (no separate reference number) of device 54A. As will be appreciated by those of skill in the art, the possible variations on the message handling rules are virtually limitless. Also, factors other than trust level value may be used in conjunction with trust level value in the message handling rules.

Figure 6:
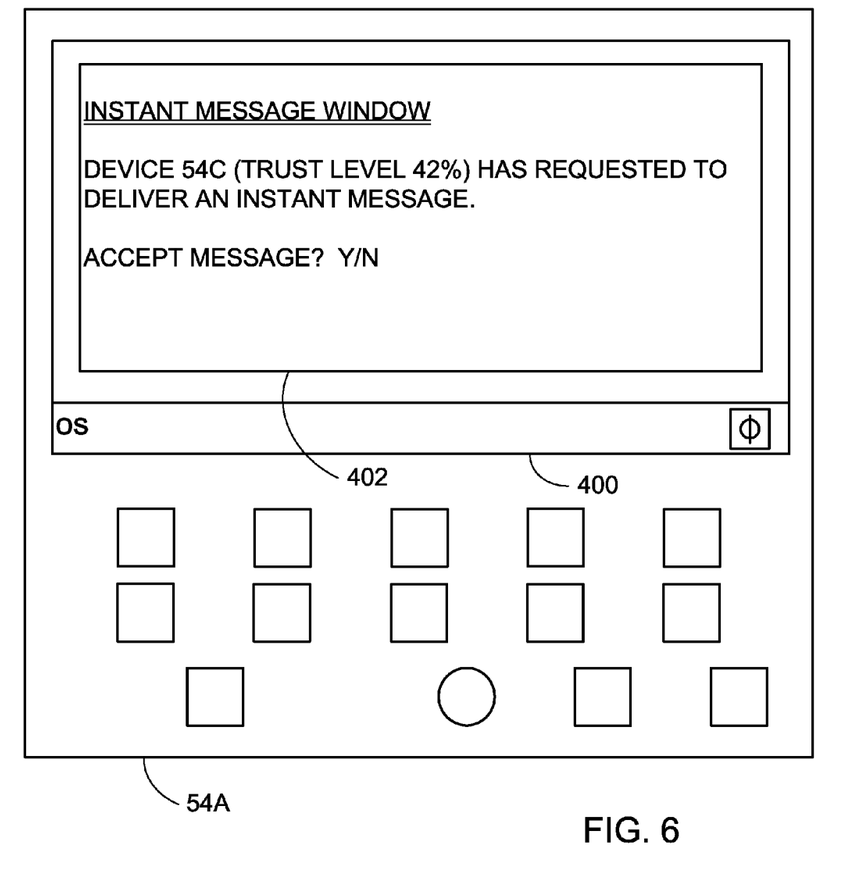
FIG. 6 is a screenshot generated by the first embodiment method.

Processing proceeds to step S275, where mod 308 handles the request in accordance with its determination(s) made at steps S260 and S270. This is shown in FIG. 6, where it has been determined that requesting device 54C has a trust level value of 42%, so the user of device 54A is given a choice as to whether, or not, to accept the IM from the requesting device.

III. FURTHER COMMENTS AND/OR EMBODIMENTS

Some embodiments of the present invention may include one, or more, of the following features, characteristics and/or advantages: (i) automatically establishes and/or modifies a trust relationship when devices communicate; (ii) customizes a user interface workflow based on the trust relationship between devices in communication; (iii) presents an improved, non-cumbersome user interface workflow when communicating with a trusted user; (iv) conducts peer-to-peer communication, such as near field communication (NFC), without going through a cell tower; (v) automatically gathers proximity data, including length of time in proximity, with respect to other devices; (vi) uses the proximity data, in conjunction with other data, such as ambient lighting, ambient noise, etc.; and/or (vii) establishes a trust level based on ambient lighting, ambient noise, number of other devices in proximity, and global positioning system (GPS) location.

Existing technologies can be used to detect nearby mobile phones and gather certain information from them. Using some currently conventional detection devices, smartphones can be detected without the need of being connected to a specific Access Point, thereby enabling detection of smartphones, laptops, hands free devices, or the like, at least when the smartphone (or like device) comes into the coverage area of the detection device. It is noted that any such detection devices (whether built into the housing of a smartphone, laptop (or the like), or used as a peripheral device) should be constructed and used in accordance with any existing laws, contractual arrangements and/or ethical obligations regarding privacy. A full discussion of privacy concerns is beyond the scope of this document, but to the extent that laws, rules and/or social mores regarding privacy, these should always be obeyed in practicing the present invention.

A trust relationship between mobile devices can be established and/or modified based on the detected information. A trust relationship is a level of trust on a continuum, or a plurality of incremental levels (herein called "trust level values"). In some embodiments, trust level values range inclusively from "no trust" to "full trust."

An example scenario where it is desired to establish a trust relationship of a sufficient level is data transmission through a delay tolerant network (DTN). In a DTN, a data packet may be transmitted from a mobile phone (a source node), and through multiple intermediate nodes (possibly including one or more other mobile phones) before arriving at a destination node. The sender of a data packet may be concerned regarding security of the data packet as it traverses the DTN.

In some embodiments of the present invention, data transmitted through a DTN is routed with respect to the trust relationships among the sending node, and intermediate nodes. Nodes with insufficient trust are excluded from the data transmission route. Further, trust relationships, once established, are dynamic and can be automatically modified in response to certain changes in environmental factors, or other factors.

In some embodiments of the present invention, when a user of device A wants to communicate with a user of device B, the device of user A will attempt to establish a communication session with the device of user B. Many different types of communication sessions (now known or to be developed in the future) are possible, including but not limited to: traditional telephone calls, VOIP calls, text messages, instant messaging, emails, RAID (redundant array of independent disks) type communications, HTML web page requests, and so on. In this example, the devices have not previously been in close proximity to each other. As a result, warning messages, in human understandable form, are supplied to users of both device A and device B. Alternatively, when a user of device A wants to communicate with a user of device B, and the devices have previously been in proximity to each other, then informational messages, rather than warning messages, are displayed.

If devices A and B are in close proximity over an extended time period, such as if the respective users are co-workers or family members, the trust levels between them is higher. Alternatively, if devices A and B are in close proximity over a short time period, as if the respective users are meeting for the first time, trust levels between them are lower. Further, if phones are in close proximity in a crowded area, such as in a large meeting or sports stadium, the trust relationship may not be as strong.

In some embodiments of the present invention, establishing trust in the correct context is important. For example, when there are many people in the same location, a user does not typically want to grant everyone the same trust relationship, as if the interaction were between two people. When meeting a large number of people, such as at a sporting event, at a movie theater, etc., there is less likelihood of a meaningful interaction than a one-on-one conversation with someone.

In some embodiments of the present invention: (i) a trust relationship between devices takes into consideration how many other devices (people) are in the same location; (ii) trust relationships rely upon how often devices are together; and/or (iii) trust relationships increase more slowly (if at all) if the devices are together in an unsafe place (that is, a place where one tends to have close spatial proximity with strangers).

Some embodiments of the present invention may include one, or more, of the following features, characteristics and/or advantages: (i) dynamically modifies trust relationships during a communication session; (ii) derives trust relationships based on sensor data; (iii) automatically modifies trust relationships if, for example, the characteristics of a location change over time; and/or (iv) automatically modifies trust relationships if, for example, the users meet in proximity to a large number of people all at once.

Further with reference to item (iii) in the above paragraph, characteristics of a location can change over time if, for instance, the location is initially empty with only two people meeting at one time and later, the location becomes crowded.

Some embodiments of the present invention may include one, or more, of the following features, characteristics and/or advantages: (i) precisely tracks trust between phones; (ii) provides reliable trust information; (iii) provides comprehensive trust information; (iv) provides accurate trust information; (v) automatically determines trust information; (vi) customizes user interface workflow according to the current trust relationship; (vii) develops trust relationships, even if phones have not previously communicated; (viii) develops trust relationships by exchanging trust levels between other trusted devices; and/or (ix) develops trust relationships based on how a communication is initiated.

In some embodiments of the present invention, a smart phone automatically collects information that is readily available from nearby phones, without the need to install any extra applications. Information available to be collected includes: (i) the device's unique media access control address (MAC address); (ii) received signal strength indicator (RSSI), from which an average distance between the scanning and detected devices can be derived; (iii) the name of the smart phone vendor; (iv) the Wi-Fi access point where the user is connected (if any), and a device name associated with the Wi-Fi access point connection (users not connected to an access point are shown as "free users"); and/or (v) the class of device, in some cases, from which is determined the type of device (smart phone, "hands free", computer, local area network (LAN)/network access point, etc.) and from which can be determined whether the device is carried, for example, by a pedestrian, or a vehicle.

The types of wireless signals that may be used in various embodiments of the present disclosure include, but are not limited to: claim 1 wherein the first set of wireless signals includes at least one of the following types of wireless signals: (i) Institute of Electrical and Electronics Engineers (IEEE) 802.11 type wireless signals, (ii) IEEE 802.15.4 type wireless signals; (iii) IEEE 802.15.1 type wireless signals; (iv) Near Field Communication type wireless signals; (v) ultra-high frequency spectrum electromagnetic signals; (vi) super high frequency electromagnetic signals; (vii) ISM (Industrial, Scientific and Medical) spectrum electromagnetic signals; (viii) electromagnetic signals of a type sent by devices to cell phone towers; (ix) radio frequency (RF) signals of the type that can power a passive device at a distance; and/or (x) other types of wireless signals now known or to be developed in the future.

In some embodiments of the present invention, an application on a device can collect information from other devices such as: (i) one or more characteristics of the ambient light; (ii) one or more characteristics of the ambient noise; (iii) spatial orientation of the phone (indicating, for example, if the phone might be in a handbag or pocket); (iv) the location of the phone as determined by the phone's GPS location; (v) time of day; and/or (vi) the number of phones detected.

Further, trust data can be shared between phones using similar applications. In some embodiments of the present invention, trust data shared between two phones in communication includes: (i) which other (third party) phones are trusted by the phones in communication; and/or (ii) the data on which those trust relationships is based. The phones in communication use the shared trust information to improve their respective trust relationships with third party phones.

In some embodiments, trust levels are dynamic. For example, in some embodiments of the present invention, once a trust level is obtained, the trust level can increase or decrease (move toward more trust or less trust respectively) when a connection is established. If a device is lying down, in a handbag, in a pocket, not in use, or in an unsafe place, the trust level may be decreased to a less trusted level, and the workflow may require more steps.

Some embodiments of the present invention perform a calculation based at least in part on some or all of the data collected from smart phones and/or devices detected in the general area. A weighting is provided for each of these values, and the weightings are dependent on other factors, such as for example, the time of day. Based at least in part on the data and weightings, a phone determines a trust relationship with respect to another phone. For example, the longer the phones stay in close proximity, the higher the trust value. Once a trust level is determined, the level can increase or decrease in response to changing factors, and status (for example, when a connection has been established). In a case where the device is lying down, in a handbag, in a pocket, not in use, or if it is in an unsafe place, trust level is decreased. If the trust level is sufficiently decreased, the workflow requires more steps, particularly security-related steps.

In some embodiments of the present invention, if a phone attempts to establish a phone-to-phone communication, a pop-up message appears on the recipient's phone to indicate the length of time the phones (the originator's and recipient's phones) have "known" each other, and asks if the user wants to connect. If, for example, two work-mates, who have worked near each other for a significant length of time want their phones to exchange data directly, a less aggressive warning message may appear. Phones that have been in close proximity for a short time may display a more aggressive warning message. When a connection is attempted, the trust level may also change depending upon for example, lighting level, noise level, number of other nearby devices detected, time of day, phone positioned in a handbag or a pocket, etc. For example, if the orientation of the phone indicates it might be in a handbag, the trust level is lowered so that the connection is treated with more suspicion or refused. Further, highly trusted phones exchange trust information about other phones, and provide weightings on the trust information, depending on the original trust value.

An alternative embodiment of the present invention (sometimes herein referred to as the "Server Based Embodiment") will now be discussed. In the Server Based Embodiment, a trusted third party maintains a Proximity Server that constantly tracks locations of a large set of communication devices on an ongoing basis (with consent of the respective owners of the communication devices). Then, when a first communications device needs a trust level on a second communications device, the first communications device checks with the third party server and the third party server determines how often the second communications device has been within proximity (say, within 100 yards) of the current location of the first communications device. This info is then used (by the third party server and/or by the first communications device) to calculate a trust level. In the Server Based Embodiment, a comprehensive location history of all devices registered with the system would be possible, which may facilitate useful trust approximations even for communication devices that have never been within Wi-Fi range of each other. Also, the Server Based Embodiment may allow verification that the devices have always been spaced apart by a very great distance, which would help refine the calculated trust level (for example, by lowering it for devices that have never been within a thousand miles of each other).

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Device location: may refer to relative device location, as between two communication devices, and/or absolute device location; for example, to an extent that an embodiment relies upon a first communication device keeping track of how often a second communication device comes into Wi-Fi range, this is information about "device location" in the form of "relative device location"; on the other hand, in an embodiment that uses complete locational history of two communication devices, based upon, for example, relatively continuous GPS (global positioning system) sent by the two communication devices, this would be the use of "device location" in the form of "absolute device location" (with this absolute device location then being used as a basis for calculating relative device location).

What is claimed is:

1. A computer program product for creating a trust level value and optimizing communication between devices based on the trust level value, the computer program product comprising:
one or more non-transitory computer-readable storage media and program instructions stored on the one or more non-transitory computer-readable storage media, the program instructions comprising:
program instructions programmed to receive a historical locational data set including information about device location for a first communication device and a second communication device;

program instructions programmed to apply a first set of machine logic based rules to the historical locational data set to create a trust level for communications, between the first communication device and the second communication device, based, at least in part, upon relative distance over time between the first communication device and the second communication device;

program instructions programmed to apply a weighting factor to the trust level wherein a trust relationship between the first communication device and the second communication device is not as strong based on a greater concentration of devices in close proximity to the first device and the second device and wherein the trust level is based on at least one of ambient lighting or ambient noise;

program instructions programmed to share, between the first communication device and the second communication device, respective trust level information with respect to a third communication device to improve their respective trust relationships with the third communication device; and program instructions programmed to improve a trust between the first communication device and the third communication device based, at least in part, on trust level information with respect to the first communication device and the second communication device.

2. The computer program product of claim 1 further comprising:

program instructions programmed, responsive to an attempted communication from the second communication device to the first communication device, to present the trust level, in human understandable form and format, through the first communication device.

3. The computer program product of claim 1 further comprising:

program instructions programmed, responsive to an attempted communication from the second communication device to the first communication device, to apply a second set of machine logic based rules to determine whether the attempted communication will be allowed.

4. The computer program product of claim 1 further comprising:

program instructions programmed to collect over time, by the first communication device, a first set of wireless signals originating from the second communication device;

wherein the historical locational data set is based, at least in part, on the first set of wireless signals.

5. The computer program product of claim 4 wherein the first set of wireless signals includes at least one of the following types of wireless signals:

(i) Institute of Electrical and Electronics Engineers (IEEE) 802.11 type wireless signals;
(ii) IEEE 802.15.4 type wireless signals;
(iii) IEEE 802.15.1 type wireless signals; or
(iv) Near Field Communication type wireless signals.

6. The computer program product of claim 4 wherein the first set of wireless signals includes at least one of the following types of wireless signals:

(i) ultra-high frequency spectrum electromagnetic signals;
(ii) super high frequency electromagnetic signals;
(iii) ISM (Industrial, Scientific and Medical) spectrum electromagnetic signals;
(iv) electromagnetic signals of a type sent by devices to cell phone towers; or
(v) radio frequency (RF) signals of the type that can power a passive device at a distance.

7. A computer system for creating a trust level value and optimizing communication between devices based on the trust level value, the computer system comprising:

one or more computer processors;
one or more non-transitory computer-readable storage media;
program instructions stored on the one or more non-transitory computer-readable storage media for execution by at least one of the one or more processors, the program instructions comprising:

program instructions programmed to receive a historical locational data set including information about device location for a first communication device and a second communication device;

program instructions programmed to apply a first set of machine logic based rules to the historical locational data set to create a trust level for communications, between the first communication device and the second communication device, based, at least in part, upon relative distance over time between the first communication device and the second communication device;

program instructions programmed to apply a weighting factor to the trust level wherein a trust relationship between the first communication device and the second communication device is not as strong based on a greater concentration of devices in close proximity to the first device and the second device and wherein the trust level is based on at least one of ambient lighting or ambient noise;

program instructions programmed to share, between the first communication device and the second communication device, respective trust level information with respect to a third communication device to improve their respective trust relationships with the third communication device; and program instructions programmed to improve a trust between the first communication device and the third communication device based, at least in part, on trust level information with respect to the first communication device and the second communication device.

8. The computer system of claim 7 further comprising:
program instructions programmed, responsive to an attempted communication from the second communication device to the first communication device, to present the trust level, in human understandable form and format, through the first communication device.

9. The computer system of claim 7 further comprising:
program instructions programmed, responsive to an attempted communication from the second communication device to the first communication device, to apply a second set of machine logic based rules to determine whether the attempted communication will be allowed.

10. The computer system of claim 7 further comprising:
program instructions programmed to collect over time, by the first communication device, a first set of wireless signals originating from the second communication device;
wherein the historical locational data set is based, at least in part, on the first set of wireless signals.

11. The computer system of claim 10 wherein the first set of wireless signals includes at least one of the following types of wireless signals:

(i) Institute of Electrical and Electronics Engineers (IEEE) 802.11 type wireless signals;
(ii) IEEE 802.15.4 type wireless signals;
(iii) IEEE 802.15.1 type wireless signals; or
(iv) Near Field Communication type wireless signals.

12. The computer system of claim 10 wherein the first set of wireless signals includes at least one of the following types of wireless signals:
(i) ultra-high frequency spectrum electromagnetic signals;
(ii) super high frequency electromagnetic signals;
(iii) ISM (Industrial, Scientific and Medical) spectrum electromagnetic signals;
(iv) electromagnetic signals of a type sent by devices to cell phone towers; or
(v) radio frequency (RF) signals of the type that can power a passive device at a distance.

* * * * *